(12) United States Patent
Uhl et al.

(10) Patent No.: US 8,019,638 B1
(45) Date of Patent: Sep. 13, 2011

(54) DYNAMIC CONSTRUCTION OF BUSINESS ANALYTICS

(75) Inventors: Stephen Uhl, Marblehead, MA (US); Robert Blatt, Berkeley, CA (US); Clint Korver, Mountain View, CA (US)

(73) Assignee: DecisionStreet, Inc., Mountain View, CA (US)

( * ) Notice: Subject to any disclaimer, the term of this patent is extended or adjusted under 35 U.S.C. 154(b) by 2304 days.

(21) Appl. No.: 10/224,393

(22) Filed: Aug. 21, 2002

(51) Int. Cl.
*G06Q 40/00* (2006.01)

(52) U.S. Cl. .................. 705/7.31; 705/7.28; 705/7.29

(58) Field of Classification Search ............ 705/7, 7.28, 705/7.29, 7.31
See application file for complete search history.

(56) References Cited

U.S. PATENT DOCUMENTS

| | | | |
|---|---|---|---|
| 4,829,426 A | 5/1989 | Burt | 364/300 |
| 5,063,522 A | 11/1991 | Winters | 395/51 |
| 5,167,011 A | 11/1992 | Priest | 395/54 |
| 5,182,793 A | 1/1993 | Alexander et al. | 395/13 |
| 5,689,652 A | 11/1997 | Lupien et al. | 395/237 |
| 5,758,328 A | 5/1998 | Giovannoli | 705/26 |
| 5,842,193 A | 11/1998 | Reilly | 706/45 |
| 5,953,707 A | 9/1999 | Huang et al. | 705/10 |
| 5,963,923 A | 10/1999 | Garber | 705/37 |
| 5,970,252 A | 10/1999 | Boxton et al. | 395/712 |
| 5,974,256 A | 10/1999 | Matthews et al. | 395/705 |
| 5,974,441 A | 10/1999 | Rogers et al. | 709/200 |
| 5,987,425 A | 11/1999 | Hartman et al. | 705/20 |
| 6,012,051 A | 1/2000 | Sammon, Jr. et al. | 706/52 |
| 6,220,743 B1 * | 4/2001 | Campestre et al. | 700/97 |
| 6,260,024 B1 | 7/2001 | Shkedy | 705/37 |
| 6,263,352 B1 | 7/2001 | Cohen | 707/513 |
| 6,298,328 B1 | 10/2001 | Healy et al. | 705/10 |
| 6,493,679 B1 | 12/2002 | Rappaport et al. | 705/29 |
| 6,655,963 B1 | 12/2003 | Horvitz et al. | 434/236 |
| 6,714,937 B1 | 3/2004 | Eynon et al. | 707/102 |
| 6,735,596 B2 | 5/2004 | Corynen | 707/102 |
| 6,751,597 B1 | 6/2004 | Brodsky et al. | 705/37 |
| 6,801,199 B1 | 10/2004 | Wallman | 345/440 |
| 6,963,854 B1 | 11/2005 | Boyd et al. | 705/37 |
| 6,968,538 B2 * | 11/2005 | Rust et al. | 717/108 |
| 6,980,966 B1 | 12/2005 | Sobrado et al. | 705/26 |
| 6,993,515 B2 * | 1/2006 | Chender et al. | 1/1 |
| 6,996,539 B1 | 2/2006 | Wallman | 705/36 |
| 7,035,772 B2 | 4/2006 | Etgen | 702/187 |
| 7,076,534 B1 | 7/2006 | Cleron et al. | 709/219 |

(Continued)

FOREIGN PATENT DOCUMENTS

JP 2001-134635 5/2001

(Continued)

OTHER PUBLICATIONS

Delen et al., An Integrated Toolkit for Enterprise Modeling and Analysis, Proceedings of the 1999 Winter Simulation Conference, Dec. 5-8, 1999, p. 289-97.*

(Continued)

*Primary Examiner* — Justin M Pats
(74) *Attorney, Agent, or Firm* — Pillsbury Winthrop Shaw Pittman LLP (57) ABSTRACT

A system and method are provided that enable dynamic construction of analytics for the evaluation of opportunities. A unique decision-focused approach simplifies the evaluation of opportunities and incorporates expertise and future-relevant judgments directly into the decision process, thereby tracking the effectiveness of those decisions with respect to selected metrics.

29 Claims, 5 Drawing Sheets

U.S. PATENT DOCUMENTS

| | | | |
|---|---|---|---|
| 7,080,371 B1 | 7/2006 | Arnaiz et al. | 717/170 |
| 7,349,879 B2 | 3/2008 | Alsberg et al. | 705/37 |
| 7,493,277 B1 | 2/2009 | Uhl et al. | 705/36 |
| 7,756,772 B1 | 7/2010 | Konopnicki et al. | 705/37 |
| 2001/0013009 A1 | 8/2001 | Greening et al. | 705/10 |
| 2001/0014868 A1 | 8/2001 | Herz et al. | 705/14 |
| 2001/0039508 A1 | 11/2001 | Nagler et al. | 705/11 |
| 2001/0047322 A1 | 11/2001 | Plate et al. | 705/37 |
| 2002/0016759 A1 | 2/2002 | Macready et al. | 705/37 |
| 2002/0019761 A1 | 2/2002 | Lidow | 705/10 |
| 2002/0038265 A1 | 3/2002 | Mertz et al. | 705/28 |
| 2002/0046125 A1 | 4/2002 | Speicher et al. | 705/22 |
| 2002/0111922 A1 | 8/2002 | Young et al. | 705/80 |
| 2002/0174049 A1* | 11/2002 | Kitahara | 705/36 |
| 2002/0188488 A1 | 12/2002 | Hinkle | 705/7 |
| 2003/0036943 A1 | 2/2003 | Grant | 705/10 |
| 2003/0167265 A1 | 9/2003 | Corynen | 707/4 |
| 2003/0177056 A1* | 9/2003 | Winther | 705/10 |
| 2004/0015382 A1 | 1/2004 | Baca et al. | 705/8 |
| 2004/0088239 A1 | 5/2004 | Eder | 705/36 |
| 2005/0096950 A1 | 5/2005 | Caplan et al. | 705/7 |
| 2005/0261987 A1 | 11/2005 | Bezos et al. | 705/27 |
| 2007/0124227 A1 | 5/2007 | Dembo et al. | 705/36 |
| 2010/0287032 A1 | 11/2010 | Wallace et al. | 705/10 |

FOREIGN PATENT DOCUMENTS

| | | |
|---|---|---|
| WO | WO 00/51051 | 8/2000 |

OTHER PUBLICATIONS

Bhattacharjee and Ramesh, Enterprise Computing Environments and Cost Assessment, Communications of the ACH, vol. 43, No. 10, Oct. 2000, p. 75-82.*

Object-oriented programming, Wikipedia.com, Jun. 1, 2007, http://en.wikipedia.org/wiki/Object-oriented_programming.*

Leeflang and Wittink, Building models for marketing decisions: Past, present and future, Intern. J. of Research in Marketing 17 (2000) p. 105-26.*

Logical Decisions for Windows, logicaldecisions.com, Aug. 14, 2001, retrieved from web.archive.org, Jun. 1, 2008, p. 1-18, http://web.archive.org/web/20010814062748/www.logicaldecisions.com/.*

Arsham, Probabalistic Modeling Process: Decision Analysis, University of Baltimore, Aug. 13, 2001, retrieved from web.archive.org, Jun. 1, 2008, p. 1-32, http://web.archive.org/web/20010813161639/ubmail.ubalt.edu/~harsham/opre640a/partIX.htm.*

Guttman and Maes, Cooperative vs. Competitive Multi-Agent Negotiations in Retail Electronic Commerce, MIT Media Laboratory, 1998, p. 135-147.*

White Paper, Profit Optimization, Outcome Software, 2002, p. 1-16.*

Center for Chemical Process Safety of the American Institute of Chemical Engineers, "Tools for Making Acute Risk Decision with Chemical Process Safety Applications", Chapter 11, "Decision Analysis" (pp. 291-358), 1995.

Kenney, Ralph L., "Decision Analysis: An Overview", Operations Research, vol. 30, No. 5, (pp. 803-838), Sep.-Oct. 1982.

Dagnese et al., "Armstrong Evaluates a New Product Concept", *1997 Handbook of Business Strategy: A Comprehensive Resource Guide to Strategic Management: From Long-Range Planning to Tactical Business Development*, published by Faulkner & Gray.

"What is Decision Analysis", Chapter 2, pp. 13-31.

Green, "Synchronized Logistics: The 1990's Vision of Leading Personal Care Manufacturers", *Soap-Cosmetics-Chemical Specialties*, vol. 67, No. 5, p. 38, May 1991, 4 pages.

"Controlling the Cost of the Supply Chain with KAPES", *Manufacturing Systems*, vol. 15, No. 3, p. 61, Mar. 1997, 2 pages.

Olinger, "A Special Breed", *AS/400 Systems Management*, vol. 26, No. 3, pp. 62-64, Mar. 1998, 4 pages.

"MAPICS: Mapics Delivers Wisdom to Midsized Manufacturers", *M2 Presswire*, Mar. 19, 1999, 2 pages.

"Perfect Launches Advanced B2B Sourcing Solution—PerfectMarket; Customers Implement PerfectMarket to Drive Evolution of Net Markets", *Business Wire*, Oct. 10, 2000, 3 pages.

"Perfect and Open Ratings Form Alliance to Provide Critical Supplier Performance Ratings to Private Exchanges and Net Markets-Leading Vendor Decision Support Tools Co-Developed by Open Ratins and Dun & Bradstreet Enable B2B . . . ", *Business Wire*, Oct. 30, 2000, 4 pages.

"Semiconbay.com Launches New Open Marketplace for the Semiconductor Industry-Introducing Hundreds of Products, from Cleanroom Supplies and Equipment and Factory Automation Products, to Research Papers and Books", *Business Wire*, Oct. 31, 2000, 2 pages.

Raleigh, "Computers are Telling Managers How to Work Better, But is Anybody Listening? The Hard Facts on Management Software", *San Jose Mercury News*, Morning Final Edition, Computing Section, p. 13F, Apr. 13, 1986, 4 pages.

McCune, "Prestol a Business Plan.", *Success*, vol. 38, No. 8, p. 59, Oct. 1991, 2 pages.

Woodward, "Analyzing and Executing Mergers and Acquisitions", *Healthcare Financial Management*, vol. 51, No. 5, pp. 62-64, May 1997, 5 pages.

Anonymous, "Leading Online E-Commerce and Entertainment Retailers Endorse Andromedia's LikeMinds Personalization Server 3.0", *Business Wire*, Jul. 15, 1999, 4 pages.

Leeflang, Peter S. H., et al., "Building Models for Marketing Decisions:; Past, Present and Future", *International Journal of Research in Marketing*, Sep. 2000, 26 pages.

Walkenbach, John, et al., "Excel 5 for Windows Handbook, $2^{nd}$ Edition", *PC World*, Copyright 1994, 21 pages.

Somette, Didier, "Large Deviations and Portfolio Optimization", Jun. 8, 1998, available at http://arXiv.org/abs/cond-mat/9802059, 39 pages.

ProQuest Search, http://proquest.umi.com/pqdweb?RQT=532&TS=1220355615&clientId=19649, printed Sep. 2, 2008, 2 pages.

Definition of Wizard, Perdana College of Malaysia, http://www.perdanacollege.com/library/glossary.html, printed Sep. 2, 2008, 8 pages.

Poland, William B., "Simple Probabilistic Evaluation of Portfolio Strategies", *Interfaces*, Linthicum, Nov.-Dec. 1999, vol. 29, Issue 6, p. 75-83.

* cited by examiner

DYNAMIC CONSTRUCTION OF BUSINESS ANALYTICS

CROSS-REFERENCE TO RELATED APPLICATIONS

This application is related to co-pending U.S. patent application Ser. No. 09/706,097, filed Nov. 3, 2000, as well as co-pending applications U.S. patent application Ser. No. 10/224,379, entitled "Business Opportunity Analytics with Dependence," U.S. patent application Ser. No. 10/224,489, entitled "System and Method For Creating and Deploying Customized Web-Based Analytical Applications," U.S. patent application Ser. No. 10/224,380, entitled "Business Portfolio Analytics," and U.S. patent Ser. No. 10/224,368, entitled "Multi-Stakeholder Software Analytics," all of which were filed concurrently with the present application. Each of the above-indicated applications is incorporated by reference herein.

FIELD OF THE INVENTION

The invention relates to a system and method that enables dynamic construction of business or other analytics for the evaluation of opportunities.

BACKGROUND OF THE INVENTION

Profit drives many corporate decisions. Yet, the long-term profitability of many decisions and transactions is hard to measure and is complicated by uncertainty (e.g., future revenues and cost) and complexity. Profit is uncertain because "black-and-white" business decisions are often made with "gray" information, such as personal expertise and gut-level assumptions about the future. Currently, there is little or no infrastructure to measure and manage such instinct-driven decisions. Furthermore, most business analytics rely at least primarily on historical data to predict future outcomes. But the past is often a poor predictor of the future. Consequently, long-term profits associated with business decisions are difficult to evaluate until after commitments have been made. Companies need a way to evaluate the impact of uncertainty.

One goal of profit optimization (PO) is to provide decision-makers with information that should guide them to more profitable decisions. In most cases, existing solutions are data-centric, focusing on all the data in transactional database systems such as enterprise resource planning systems and customer relationship management systems. Consequently, extensive integration projects are required to link the transactional systems' databases into a common platform for analysis and reporting. Once integrated, the systems produce a deluge of data about historical trends, in the form of analytical reports. While analysis of past transactions does support better decisions, it is only a part of the decision-making process.

Complexity compounds the problem. Many transactions include complex bundles of products, services, financing terms, and a host of other factors. Since many organizations rank the profitability of opportunities based on departmental objectives or local expertise, they can overlook how differing priorities impact the overall profitability of a customer relationship, or how individual transactions impact portfolios of opportunities. As the demand for customized transactions increases, so too does the complexity of managing those transactions to a profitable end. Complexity is further compounded when the entire portfolio is considered.

Most data-centric analytic models focus on interpreting the trends and key drivers found within all available company data. Consequently, intense and often costly integration is required to link these transactional databases for traditional reporting means. While better than nothing, these forecasting approaches are predicated on historical, empirical data that is limited by its lack of relation to current market or company conditions. Decision makers are therefore left to predict the future based on events of the past, externally considering intangibles such as personal expertise and instinct to effect profitable decision making. In short, the decision-making occurs outside the system. There is no way to track the effectiveness of decisions or to retain the methods used to reach profitable decisions.

Under existing schemes, after reviewing reports, decision-makers usually include information they know, but that is not stored in the transactional databases. They interpret the combined data within the context of their personal expertise and judgment to form opinions about the future. They then apply their own functionally biased reasoning to reach a decision all outside the system. The relationship of the decision to the analysis is not tracked or measured. It is difficult to directly link the results of the analysis with the profitability of the related business decision. Most existing systems attempt to provide PO software based on a data-centric approach, because they have evolved from database systems.

These and other drawbacks exist.

SUMMARY OF THE INVENTION

The invention relates to an Enterprise Profit Management (EPM) system and method that addresses these and other drawbacks of known approaches. The system and method provides organizations with an enterprise-wide view of profitability and a mechanism to simplify the analysis.

One aspect of the invention relates to the ability to dynamically construct business analytics. The invention enables the definition of opportunities, the components of an opportunity, and the entities that make up the components, in a modular, object-oriented fashion. Each of these items can be dynamically combined, in nearly infinite permutations, at run-time to create a specific instance of an opportunity The opportunity can then be evaluated on an economic basis, depending on all the unique items that were used to construct it.

According to an aspect of the invention, the system and method comprise a protocol that enables these diverse entities (e.g., opportunities, products, customers, channels and other entities) to be assembled dynamically at run-time into an economic evaluation or metric. This approach enables a user to define a finite set of entities that can be combined in near infinite permutations without having to anticipate each permutation ahead of time.

One advantage of the invention is that all permutations of components do not need to be anticipated ahead of time, as they would be in most other static analytic models. In fact, anticipating all of the permutations would be nearly impossible in many situations where the number of different products and customer combinations is large.

Another advantage of the invention is that the specific business logic or behavior of a component, such as a product or a customer, is encapsulated. Each entity has certain defined interfaces to the rest of the system, but the actual business rules that govern it are hidden from view. This allows new, completely different, components to be added, at any time, to an existing system without modifying or disrupting existing logic or databases.

One advantage of the invention is that it facilitates a unique decision-focused approach that simplifies the evaluation of corporate profitability and other opportunities. Building on existing corporate tools and data, the invention incorporates company expertise and future-relevant judgments directly into the decision process, and tracks the effectiveness of those decisions with respect to profitability.

Another aspect of the invention relates to a set of algorithms that enable the software to calculate economic statistics or other metrics of a portfolio of opportunities or entities rather than just individual opportunities or entities. This aspect of the invention is particularly useful where detailed statistics or other metrics associated with the opportunities or entities have a number of variables that must be projected.

One advantage of this aspect of the invention is that it enables the full impact of the probability distribution of each opportunity or entity to be preserved and its impact on the portfolio measured. Therefore the algorithms do more than add up individual opportunities or entities. They add up the underlying probability distribution of the individual entities to arrive at a portfolio distribution. Advantageously, the algorithms require a relatively small set of calculations so that the computation time is rapid. Thus, a significant improvement over various other approaches known to exist.

An additional benefit of the invention is that it provides a generalized format to specify how the economic statistics should be treated at the portfolio level. This enables the application to measure such things as gross margin percentage and other metrics which are not inherently additive. According to one embodiment, this aspect of the invention is implemented using the statistical concepts of moments and cumulants and applies them to portfolio analysis in an enterprise software application.

Another aspect of the invention relates to the ability to use algorithms to economically evaluate an entity within the context of uncertain assumptions, taking into account the interrelationship (portfolio effects) that may exist between entities. According to this aspect of the invention, the algorithms build on an underlying sensitivity analysis that uses low/base/high assumptions for uncertain assumptions (variables) to create a set of analytic equations. The algorithms can include dependence between entities (portfolio effects) so that the evaluations can measure the true impact of a decision on business results, as opposed to a stand-alone evaluation.

According to another aspect of the invention, the system and method comprise a set of algorithms that enables software to calculate the economic statistics of an opportunities or entity from the perspective of a variety of stakeholders. For example, an entity or opportunity may be valued differently by different stakeholders (e.g., a customer, a company, or a partner). Other stakeholders may be considered. The invention systematically defines these stakeholder relationships and how their value perspective can be calculated. The system can then apply optimal relation techniques that enable the enterprise software to recommend appropriate trade offs of deal terms or other elements of the entity or opportunity, that result in more optimal configuration to provide benefits to all stakeholders.

According to another aspect of the invention, there is provided a dynamic configuration console. The dynamic configuration console is a tool that enables the creation and deployment of customized web-based analytical applications remotely and without any technical coding work by the creator. Rather, the creator uses the dynamic configuration console to make various selections through templates, wizards, or other tools and, upon completion of the selections, the system automatically customizes the analytic application according to the users preferences. According to one aspect of the invention, the system creates or modifies a relational database that contains various data elements needed for the deployment.

One embodiment of this aspect of the invention includes various user interface pages and elements through which the end user interacts with the system. Various XSD schemas govern how the system creates XML files used by the system. This aspect of the invention can be used to create analytical equations or metrics that are used to process information in the system and/or other information. An advantage of this approach is that the protocol is generalized and can be applied across diverse industry sectors such as financial services, manufacturing and other sectors without the need to pre-write code.

According to some embodiments of the invention, a number of software modules may be provided on an application server or other suitable device in order to implement the functionality of the invention described herein. Data and information that may be useful for profitability decisions is stored in a database or other suitable archive in communication with the application server. The application server and the database may comprise stand-alone devices, distributed devices, networked devices, or any other suitable configuration. Users may access the application server directly (e.g., at a workstation or other terminal), via a network (e.g., over the Internet using a browser), wirelessly, or in any other suitable manner. In some embodiments, information and data may be collected and stored in a database from other enterprise systems (e.g., customer information, sales information, etc.). It is also possible to store and use data and information from other outside sources (e.g., external data such as stock prices, interest rates, etc.). Other data sources may be used.

Other aspects of the invention will become apparent from the following detailed description considered in connection with the accompanying drawings that disclose embodiments of the present invention. It should be understood, however, that the drawings are designed for purposes of illustration only and not as a definition of the limits of the invention.

DETAILED DESCRIPTION OF THE INVENTION

Figure 1:
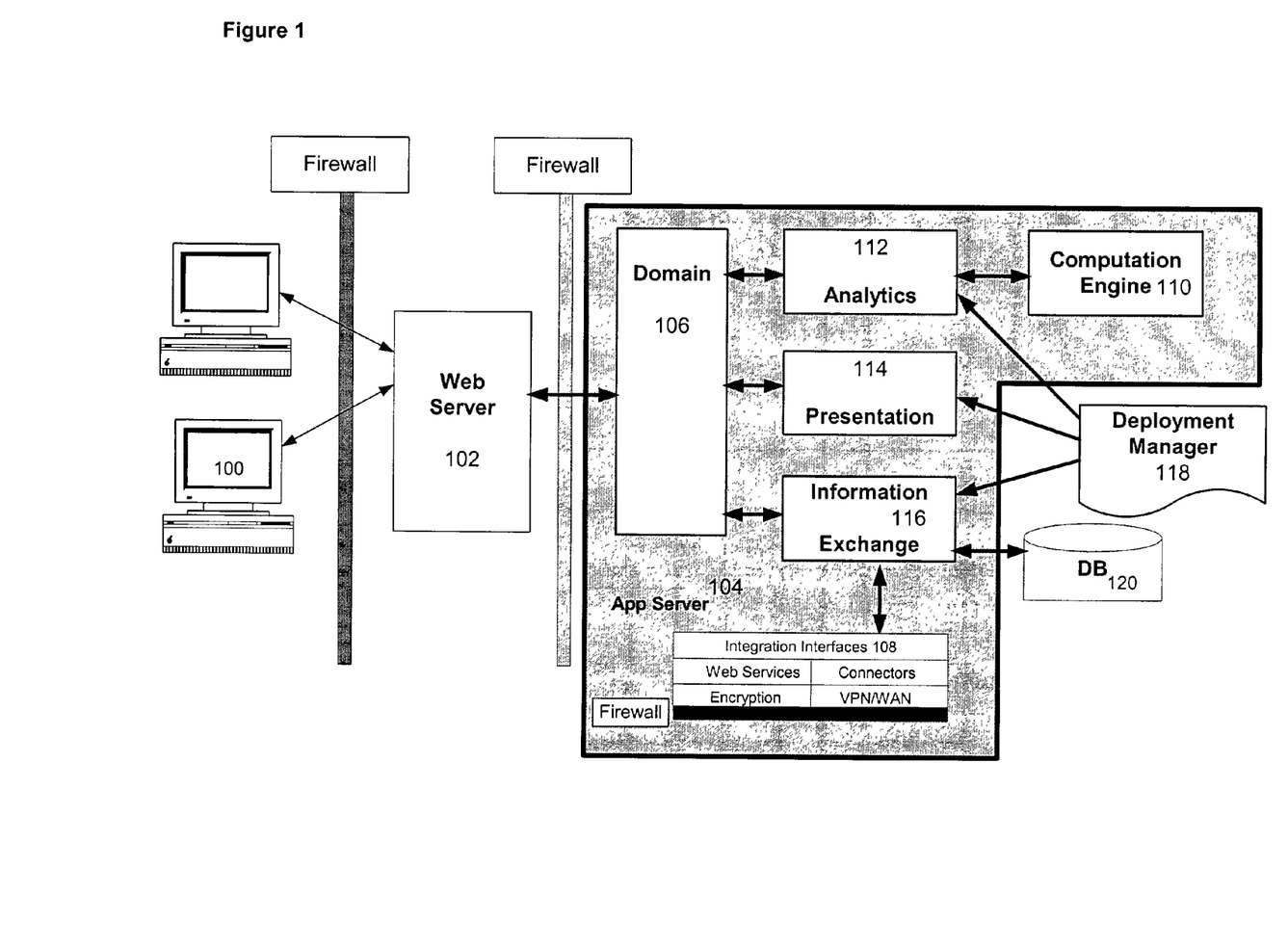
FIG. 1 illustrates a schematic block diagram of the overall system according to some embodiments of the invention.

FIG. 1 is a schematic block diagram of the overall system according to one embodiment of the invention. The end-user 100 accesses the application server 104 which provides the application functionality. The application server includes and interacts with a number of software modules. Other computer-implemented architectures may be used.

In one embodiment of the invention, the software includes a domain 106, which controls the three main sub-systems which are analytics 112, presentation 114, and information exchange 116. Each of these sub-systems is customized for different deployments of the software through a Deployment Manager 118 (see the discussion in the co-pending application entitled "System and Method for Creating And Deploying Customized Web-Based Analytical Applications"). The separation of the presentation, analytic, and information exchange modules allows the analytics to be defined and specified independent of the device on which the end user will receive a presentation of results.

The analytics module 112 exercises a core computational engine 110 in order to perform analytical calculations. The core computational engine receives requests from the analytic module to perform particular computations and returns results to the analytics module.

The information exchange module 116 employs a database 120 for storing attributes about each entity and opportunity in the system as well as calculated results and other information. In a stand-alone deployment where no external information is accessed, all of the data for a system is stored in the database. The information exchange module 116 allows for integration with external systems and access to other sources of information.

The presentation module 114 creates the screens, such as web pages, which are presented to the user. The user interacts with these screens to change values for attributes, to see help text, and to view evaluation results. The presentation module delivers this information to the end user in a format appropriate for their device and manner of access.

As detailed herein, a user may create and define opportunities. The system can calculate and display a metric in the form of a tornado chart. As shown for example in FIG. 3, one type of metric (profit) may be represented by a Profit Sensitivity Chart that represents a profitability map. The profitability map may be displayed as a result of an opportunity evaluation performed by the system. The Profit Sensitivity Chart assembles the components (factors or variables) affecting the profit of an opportunity or a decision. The chart may identify the most likely result, what factors have the largest potential impact (key drivers), what risks are the most important, what components have the most leverage to improve profitability, and what issues are less critical. This level of detail typically is not possible with a data-centric approach.

Figure 3:
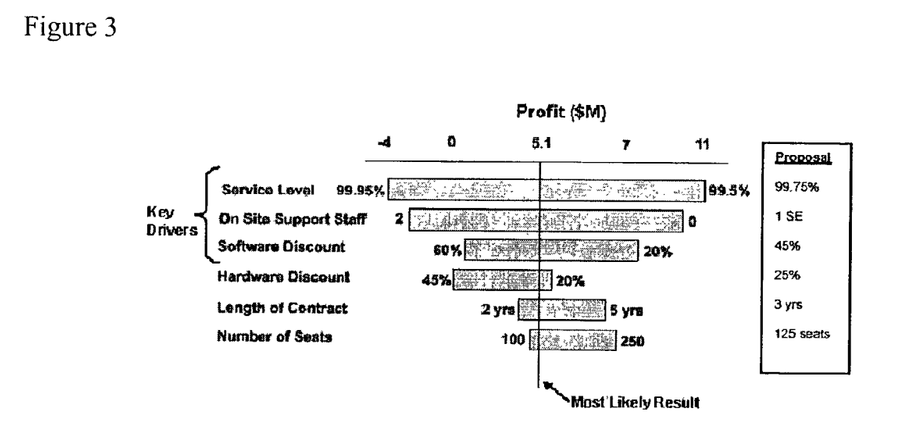
FIG. 3 illustrates a Profit Sensitivity Chart example of a profitability map that may be displayed as a result of an opportunity evaluation according to some embodiments of the invention.

Profitability maps, such as the one shown in FIG. 3, allow the analytic functions of the invention to become much more than typical rules-based solutions. For example, rules-based software simply pre-determines what decision should be made in particular situations leaving little or no room for judgment, and little or no ability to judge the robustness of a decision or the factors that a manager has to improve profitability. On the other hand, profitability maps generated by embodiments of the present invention supplement a simple recommendation with the "whys" and "hows" behind it, making the solution and analytics transparent.

More specifically, FIG. 3 is an example of a profit sensitivity evaluation for a solutions sale from a company that bundles hardware, software, network capacity, and overall solutions support. Based on the current proposal, the most likely long-term profit for this customer is $5.1M. From this map, a company can see that the key drivers of the profitability of this proposal are related to the service level (e.g. promises for future uptime of the solution), on-site support staff to sustain operation of the solution, and a software discount. The most likely result can be used to generate a proposal.

Some advantages of this decision-focused approach may include focusing the analytics and data on the information necessary for decision-making, resulting in smaller data needs and reducing integration efforts, enabling the expertise and judgments of people in the organization to be collected, made consistent, tracked, and converted into a business asset that can continue to enhance future decisions, and providing of more than just an enhanced "answer" that allows an organization to learn how to further enhance the bottom-line and reduce risk.

Embodiments of the invention enable the dynamic building of business analytics. This may be accomplished through the architecture of the modeled opportunities. As used herein, and as graphically depicted in FIG. 2, the term "opportunity" includes a top-level entity that is to be evaluated (e.g., a specific business, or other opportunity or decision around which a user wants to perform economic evaluations) or other metrics. The term "component" includes items or entities (e.g. products, customers, distribution channels, etc.) that are determined to relate to the opportunity.

Figure 2:
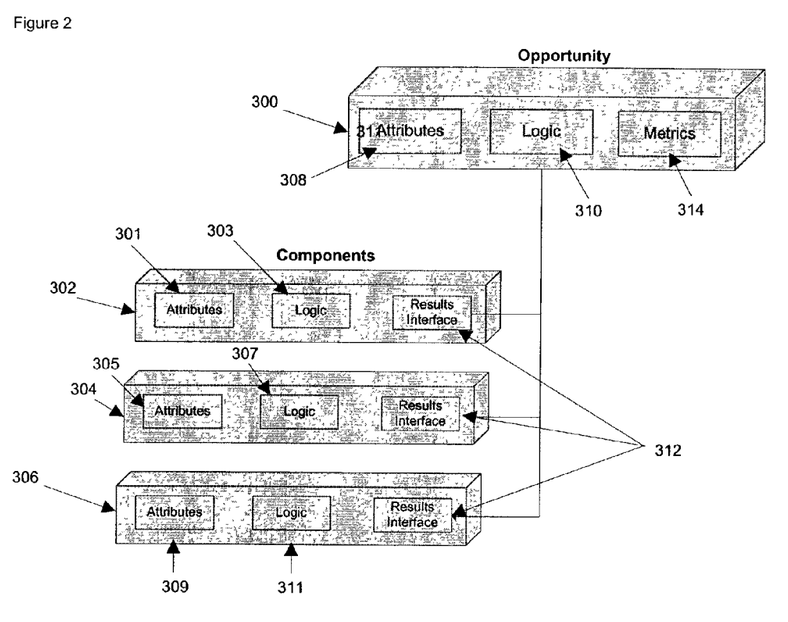
FIG. 2 illustrates a schematic illustration of the architecture of component and opportunity objects according to some embodiments of the invention.

FIG. 2 is a schematic illustration of the architecture of a modeled opportunity and the components that define the opportunity. For example, the opportunity 300 may be a wrapper entity that encapsulates all components (e.g., components 302, 304, 306) selected by a user to relate to the opportunity. The opportunity may be dynamically assembled at run-time.

For a specific deployment of the system, the opportunity can be configured by defining any attributes 308 that are specific to the opportunity but which do not depend on a component (e.g., attributes or properties of the opportunity such as "Date Created" or "Opportunity Name") and any business rules or logic 310 associated with the opportunity (e.g. rules that define which components can/must be selected and assembled into the opportunity). For example, rules may indicate, for each component, whether that component is required or optional, and how many of that component can or must be assembled, etc. For example, an opportunity might require exactly 1 customer selection and 1 to 10 product selections. These selections are then required for the opportunity to become a valid, calculatable opportunity. For any opportunity a number of metrics 314 can be determined (e.g. NPV, gross margin %, etc.).

In some embodiments, the calculations required to evaluate an opportunity for a particular application are embedded within the opportunity as business logic 310. For example, business logic 310 embedded in the opportunity object 300 may include logic that assembles the results 312 that come from evaluation of each of the component entities 302-306. Other embedded business logic 310 may include logic that layers on any additional logic for the opportunity. This logic may be general logic applicable to any opportunity regardless of its component parts or specific to the opportunity.

Each entity (302, 304, 306) may have associated with it attributes (301,305,309), logic (303,307,311), and a results interface 312. The term "attribute" includes, for example, a data element or other attribute of the entity. The actual value of an attribute may be provided by the user or by reference to an existing database or other data source (either in advance or at run-time). The term "run-time" includes, for example, the time when the user actually assembles or defines a specific opportunity or calculates a metric associated with the opportunity. The term "compile-time" includes, for example, the time when the system is configured or customized for a particular deployment. The logic (303,307,311) associated with a component entity (302, 304, 306) can include, for example, business rules or other logic associated with the component that enable a value for that component to be determined and provided to a result interface. The results interface is the output of a component that is used by the opportunity logic to determine a metric associated with an opportunity.

The results interface 312 ensures that the format of these results do not depend on which specific entities (e.g. products or customers) were selected. For example, all entities (e.g. products) may provide an identical or consistent data format to the opportunity.

In some embodiments, each component 302, 304, 306, may be defined by its inputs and its outputs. Internal calculations of a specific component may be hidden from the other parts of the system. In some embodiments, individual components may have any set of inputs. The inputs may be common to a whole class of products, or unique to a specific product. When a product is added into an opportunity, the system may identify, based on that product, the required data for that product to calculate. The entity business logic may also refer to attributes of the opportunity, or attributes of another entity, as long as that attribute will be known to be present within the opportunity at run-time.

Figure 4:
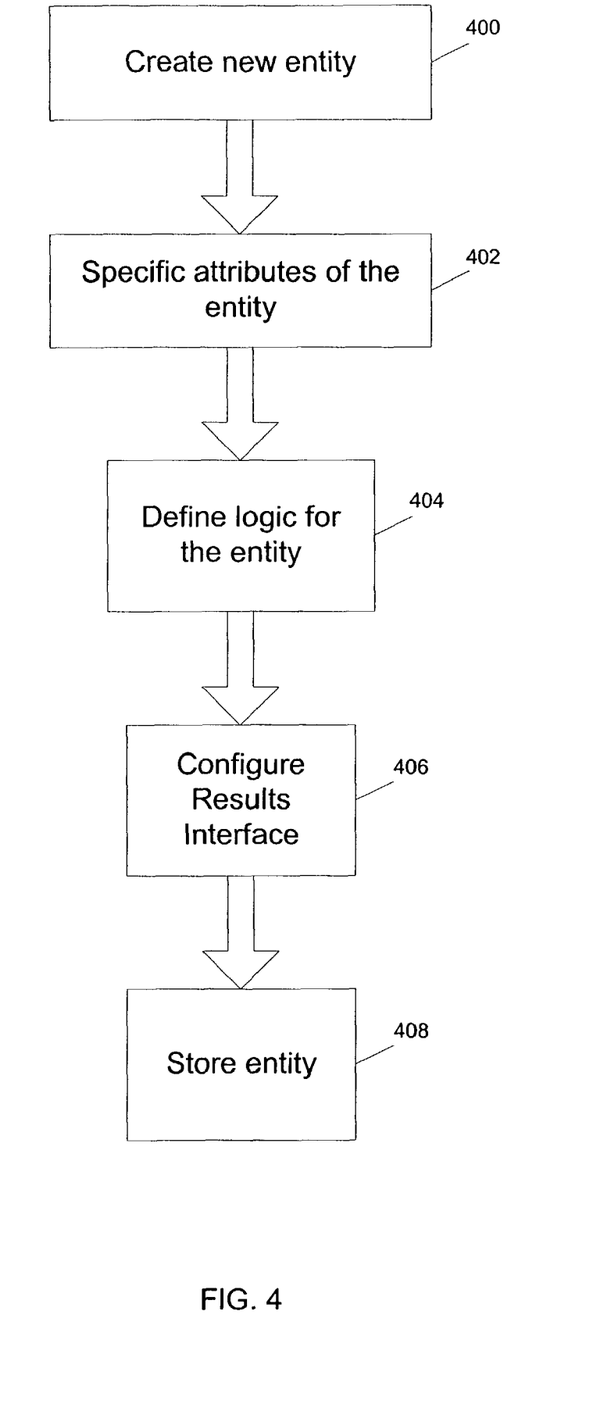
FIG. 4 illustrates a block diagram showing steps for creating an entity.
Figure 5:
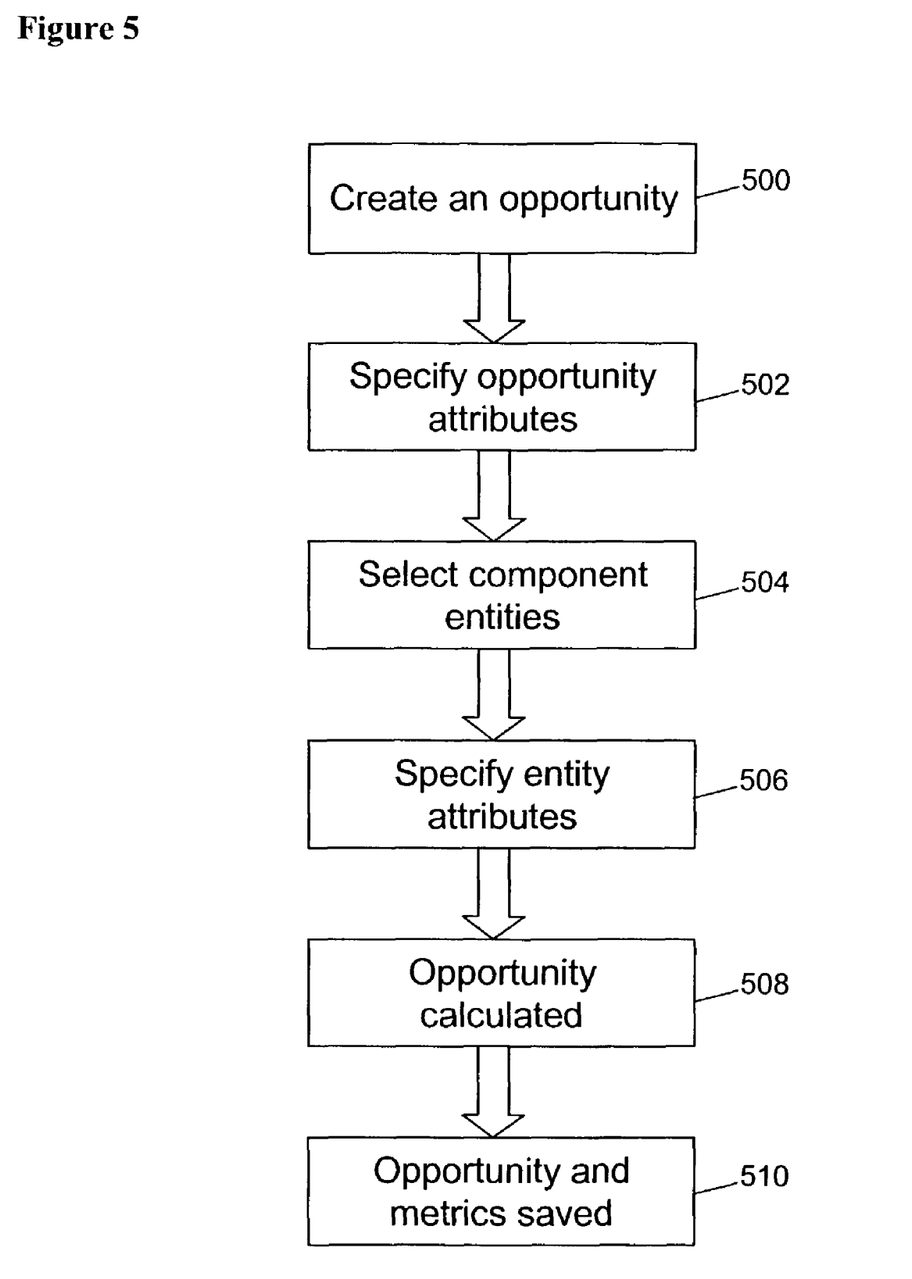
FIG. 5 illustrates a block diagram showing steps for creating an opportunity and metrics associated with the opportunity.

As shown in FIGS. 4 and 5, the entities and opportunities may be created, stored, and otherwise managed.

In FIG. 4, a new entity is created at step 400. The attributes of the entity are specified at step 402, the logic for the entity is defined at step 404, and the results interface for the entity is configured at step 406 to provide a consistent data format for data transfer to the opportunity. The entity is then stored at step 408. In many cases, numerous entities will share the same logic. For example, a number of different product entities may share the same logic and be distinguished only by having different attributes.

In FIG. 5, a new opportunity is created at step 500. The attributes of the opportunity are specified at step 502, the component entities for the opportunity are selected at step 504, the attributes for the selected entities are specified in step 506, the opportunity is calculated in step 508, and the opportunity and its associated metric results are stored in step 510.

An embodiment of the invention uses a decision-focused model to generate and retain predictive, profitable decisions. The decision-focused model begins not with an amalgamation of unconnected data, but with a desired outcome. Working backwards, the software allows companies to define the key drivers and information that are material to the decision. Executives can determine corporate fiscal goals and input future-relevant judgments; managers can allocate top resources to these goals; and the sales force can construct customized offerings so as to ensure a win-win situation for the customer and the company. A central policy hub captures successful profitability decisions and allows the sales force to leverage these models in order to meet company goals—each and every time. In short, the invention enables decisions inside the system.

The system enables analytics to be modeled and executed on a server while outcomes are displayed via a web browser. Information associated with a decision is tracked and stored (e.g., in a database) for later analysis. Analytics can be consistently applied to all opportunities thus allowing these opportunities to be fairly compared with one another. In addition, the functionality of the invention may be structured as complete solutions individually or can be deployed as a suite.

Among other things, the invention enables a user to evaluate the key drivers of a metric (e.g. profit) for individual opportunities, show the range of outcomes (e.g. profits) that can be expected given the uncertainty of key drivers of the metric, recommend specific actions to improve the outcome (e.g. profitability) of the opportunity, allow subsequent advantageous action (e.g. enable sales force representatives to negotiate on the terms that ensure maximum profitability), identify and allocate the key resources needed to produce the outcome (e.g. ensure sales opportunity profitability), perform scenario analysis across multiple company objectives and forecast and manage both the top line and the bottom line.

This decision-focused approach to profitability management enables several advantages. Cumbersome and costly integration may be avoided because the solution incorporates information that is predetermined to be material to the desired outcome (e.g. profitability decision). Moreover, intangible variables such as judgment, instinct, and prediction are incorporated within the system as a series of ranges that generate potential outcomes. Each can be tracked, evaluated, and used to determine best-path options for decision makers. Furthermore, because these decisions are made and recorded within the system, the effectiveness of those decisions can also be tracked and evaluated. Because decision makers at each level may have access to the specific information necessary to make a profitable decision, everyone in the company can determine how his or her individual decisions will impact the top and bottom lines. This allows a company to manage and evaluate the profitability of its decision-making process, from the executive level to the sales level.

A decision-focused approach begins with the decision and then uses important information, wherever it resides, to drive the most profitable decision. This approach is a fundamentally different, more powerful paradigm than the data-centric approach.

The invention, through implementation of known decision analysis (DA) techniques is useful for large, strategic decisions with significant uncertainty as well as for smaller decisions that are made frequently, such as deciding which combination of unique terms can be offered profitably to individual customers. Frequently made decisions that contain some uncertainty and risk, called "risky, recurrent decisions," can leverage DA in those embodiments of the invention comprising reusable software applications. The software may be structured as a business model template for a specific vertical application, tailored to the individual company using the model, plus a "decision engine," which is a scalable process of DA algorithms complied in software.

The business model template may capture the key influencers of a desired decision, and model the business rules of a company, as a "Knowledge Map" of the decision process. Inputs for decision requests and information are processed by a decision engine, that calculates a range of likely outcomes that will result from a given decision, clearly identifying the most significant drivers of profitability and ranking them in order of importance. The decision is made (and stored) in the system, and the system allows the decision maker to converge on the most profitable decision.

A knowledge map may describe any class of decision, such as launching a marketing program. The knowledge map identifies the factors that affect profitability and describes how they interact. It codifies the collective expertise embedded in the minds of individuals in the organization. Knowledge maps may also be used to take unstructured knowledge that exists in the minds of individuals (i.e., not stored in the database) and transform it into a systematic, measurable, business asset.

The knowledge map may be created only once for a class of decisions. It then becomes the reusable template for analyzing all decisions of the same type. The specific data will change, but the knowledge map remains relatively constant. The knowledge map represents the corporate reasoning that is applied to the data, expertise, and judgment that are available to the decision-making process. Capturing corporate reasoning in software allows the consistency and quality of decision to be measured and managed.

When a particular decision is analyzed, each factor in the knowledge map may be quantified. Some of the data may come from transactional databases, in the instances where these are the best source for particular information. Other factors do not have supporting databases—numbers are either expertise embedded in the knowledge map, or judgments directly input into the software system by sales people and executives. Each input factor may include a range of uncertainty—an explicit measure of the confidence level of estimates. For example, the "Future interest rates" factor is represented as a distribution of expectations.

Each factor can contain a "Low-Base-High" range of inputs. Specifically, for an interest rate example, the "low" entry may be the rate where one believes there is only a 10% chance that future rates could be lower, the "base" value may be a best estimate of what interest rates will be, and "high" may be the value where one believes there is only a 10% chance that interest rates could be even higher. These ranges may be described as the "80% confidence interval" for given factors.

The system may treat the input ranges as a probability distribution of estimated outcomes for each associated influence factor. In some cases, where there is a large base of historical data and little likelihood of change, the range will be very narrow. In other cases, confidence in forecasting the ranges will be lower, and the confidence interval will be large. Explicit quantification of uncertainty allows the decision engine to measure the risk of any decision and the robustness of any recommendation. Furthermore, in a profit optimization application, the system can determine how sensitive the profitability of a decision is to the degree of uncertainty for any input range. If the profitability is highly sensitive to an information factor that has a large range, salespeople and executives can spend time or money getting better estimates to refine the ranges and reduce the profitability risk. If the profitability is sensitive to one or more deal terms, the sales organization can negotiate with the customer for a narrower set of alternatives in that part of the transaction. Similar action can be taken for other factors.

The decision engine computes analytical results based on the provided data, judgment and expertise. As mentioned above, some information may come from database integration. One advantage of a decision-focused approach is that it typically needs only a small fraction of the information in the database. In fact, rather than investing in full-blown data integration, the present invention enables a "thin-pipe" approach to data, extracting data for only the influence factors that are material to the decision.

In some embodiments, judgment and expertise may be stored in the system by salespeople and executives via a simple user interface. The decision engine characterizes each decision and measures the value, risks, drivers, and leverage points associated with it. In contrast to the data-centric profit optimization models, all the information used to drive the decision is inside the system.

What is claimed is:

1. A computer-implemented system for dynamic creation of analytics for the evaluation of opportunities, the system comprising:
    an application server comprising one or more processors, the one or more processors configured to execute a plurality of processing modules including:
        a first module that creates component objects that model components of opportunities, a given component object comprising component attributes and component logic, wherein the component logic comprises one or more rules that are applied to the component attributes to generate a result associated with the given component object;
        a second module that creates an opportunity object that models an opportunity, the opportunity object comprising opportunity attributes and opportunity logic;
        a third module that associates one or more of the component objects with the opportunity object based at least in part on at least one user selection of an individual component object;
        a fourth module that obtains inputs for the component attributes of the associated one or more component objects, wherein at least one of the inputs comprises a range of uncertainty that represents uncertainty associated with a value of the corresponding component attribute;
        a fifth module that calculates at least one metric representing the value of the opportunity, wherein calculation by the fifth module of the at least one metric comprises (i) generating results for each of the associated one or more component objects by applying the component logic of the associated one or more component objects to the obtained attributes of the associated one or more component objects, and (ii) generating the at least one metric by applying the opportunity logic to the previously generated results for each of the associated one or more component objects, wherein the at least one metric that comprises a range of outcomes that represents uncertainty of the value of the opportunity, the uncertainty of the value of the opportunity being at least in part a function of the uncertainty associated with the value of one or more of the component attributes; and
        a sixth processing module that determines one or more key influencers of the uncertainty of one or more of the at least one metric generated by the fifth module, wherein the key influencers of a metric are the component attributes of the associated one or more component objects that have the greatest influence on the uncertainty of the metric.

2. The system of claim 1, wherein the opportunity object is a wrapper entity that encapsulates the associated one or more component objects.

3. The system of claim 1, wherein the opportunity attributes of the opportunity object include attributes that are defined by a user, are specific to the modeled opportunity, and are not defined by a component object associated with the opportunity object or any logic associated with the opportunity.

4. The system of claim 1, wherein a range of uncertainty that represents uncertainty associated with a value of a corresponding component attribute comprises a confidence interval that represents the probability of different values in the range of uncertainty being an accurate representation of the actual value of the component attribute.

5. The system of claim 4, wherein the confidence interval is input as a low value that is likely to be lower than the actual value of the component attribute, a base value that is the most likely actual value of the component attribute, and a high value that is likely to be higher than the actual value of the component attribute.

6. The system of claim 5, wherein there is a less than about 10% chance that the actual value of the component attribute is less than the low value and there is a less than about 10% chance that the actual value of the component attribute is greater than the high value such that the confidence interval is an 80% confidence interval.

7. The system of claim 1, wherein the component objects further comprise results interfaces that ensure that the format of the results for different component objects is uniform between the different component objects and does not vary.

8. The system of claim 1, wherein individual component objects are created, managed and stored separately from each other.

9. The system of claim 1, wherein the created opportunity object is created, managed and stored separately from other opportunity objects.

10. The system of claim 1, further comprising a core computational engine to perform analytical calculations, the core computational engine receiving requests from the fifth module and returning results to the fifth module.

11. The system of claim 1, further comprising an information exchange module and at least one data source, wherein the at least one data source stores at least one input for at least one of the component attributes of the associated one or more component objects and the fourth module obtains the stored at least one input via the information exchange module.

12. The system of claim 1, wherein the third module generates a display that is conveyed to the user, the display including representations of a plurality of component objects and enabling the user to select one or more of the displayed component objects for association with the opportunity object by making a selection of the representations of the one or more component objects.

13. The system of claim 1, wherein the fifth module calculates the at least one metric associated with the opportunity at a run time.

14. The system of claim 1, further comprising a seventh processing module that determines one or more key drivers of one or more of the at least one metric generated by the fifth module, wherein the key drivers of a metric are the component attributes of the associated one or more component objects that have the greatest influence on the metric.

15. The system of claim 14, wherein the seventh processing module ranks the key drivers of one of the generated metrics in order of magnitude of impact on the metric.

16. The system of claim 1, wherein the selection of the one or more component objects by the user, and the resulting association of the selected one or more component objects with the opportunity object, is one of a plurality of possible different permutations in which the component objects are associated with the opportunity object.

17. The system of claim 1, wherein the first, second, third, fourth, and fifth modules are applicable to different types of analytics.

18. The system of claim 1, wherein the sixth processing module further determines one or more actions that would reduce the uncertainty of one or more of the at least one metrics that are generated.

19. A computer-implemented method for dynamic creation of analytics for the evaluation of opportunities, the method comprising:

creating component objects that model components of opportunities, a given component object comprising component attributes and component logic, wherein the component logic comprises one or more rules that are applied to the component attributes to generate a result associated with the given component object;

creating an opportunity object that models an opportunity, the opportunity object comprising opportunity attributes, and opportunity logic;

associating one or more of the component objects with the opportunity object based at least in part on at least one user selection of an individual component object;

obtaining inputs for the component attributes of the associated one or more component objects, wherein at least one of the inputs comprises a range of uncertainty that represents uncertainty associated with a value of the corresponding component attribute;

calculating, using a computer processor, at least one metric representing the value of the opportunity, wherein calculating the at least one metric comprises (i) generating results for each of the associated one or more component objects by applying the component logic of the associated one or more component objects to the obtained attributes of the associated one or more component objects, and (ii), subsequent to generating results for each of the associated one or more component objects, generating the at least one metric by applying the opportunity logic to the results generated for each of the associated one or more component objects, wherein the at least one metric that comprises a range of outcomes that represents uncertainty of the value of the opportunity, the uncertainty of the value of the opportunity being at least in part a function of the uncertainty associated with the value of one or more of the component attributes;

determining one or more actions that would reduce the uncertainty of the value of the opportunity; and storing the at least one metric to an electronically readable medium.

20. The method of claim 19, wherein the opportunity object is a wrapper entity that encapsulates the associated one or more component objects.

21. The method of claim 19, wherein the opportunity attributes of the opportunity object include attributes that are selected by a user, are specific to the modeled opportunity, and are not defined by a component object associated with the opportunity object or any logic associated with the opportunity.

22. The method of claim 19, wherein a range of uncertainty that represents uncertainty associated with a value of a corresponding component attribute comprises a confidence interval that represents the probability of different values in the range of uncertainty being an accurate representation of the actual value of the component attribute.

23. The method of claim 22, wherein the confidence interval is input as a low value that is likely to be lower than the actual value of the component attribute, a base value that is the most likely actual value of the component attribute, and a high value that is likely to be higher than the actual value of the component attribute.

24. The method of claim 23, wherein there is a less than about 10% chance that the actual value of the component attribute is less than the low value and there is a less than about 10% chance that the actual value of the component attribute is greater than the high value such that the confidence interval is an 80% confidence interval.

25. The method of claim 19, wherein the component objects further comprise results interfaces that ensure that the format of the results for different component objects is uniform between the different component objects and does not vary.

26. The method of claim 19, further comprising determining one or more key drivers of one or more of the at least one metric representing the value of the opportunity, wherein the key drivers of a metric are the component attributes of the associated one or more component objects that have the greatest influence on the metric.

27. The method of claim 26, further comprising ranking the key drivers of one of the generated metrics in order of magnitude of impact on the metric.

28. The method of claim 19, further comprising displaying one or more of the component objects to a user to enable a user selection of at least one individual component object for association with the opportunity object.

29. A computer-implemented method for dynamic creation of analytics for the evaluation of opportunities, the method comprising:

creating component objects that model components of opportunities, a given component object comprising component attributes and component logic, wherein the component logic comprises one or more rules that are applied to the component attributes to generate a result associated with the given component object;

creating an opportunity object that models an opportunity, the opportunity object comprising opportunity attributes, and opportunity logic;

associating one or more of the component objects with the opportunity object based at least in part on at least one user selection of an individual component object;

obtaining inputs for the component attributes of the associated one or more component objects, wherein at least one of the inputs comprises a range of uncertainty that represents uncertainty associated with a value of the corresponding component attribute;

calculating, using a computer processor, at least one metric representing the value of the opportunity, wherein calculating the at least one metric comprises (i) generating results for each of the associated one or more component objects by applying the component logic of the associated one or more component objects to the obtained attributes of the associated one or more component objects, and (ii), subsequent to generating results for each of the associated one or more component objects, generating the at least one metric by applying the opportunity logic to the results generated for each of the associated one or more component objects, wherein the at least one metric that comprises a range of outcomes that represents uncertainty of the value of the opportunity, the uncertainty of the value of the opportunity being at least in part a function of the uncertainty associated with the value of one or more of the component attributes;

determining one or more key influencers of the uncertainty of one or more of the at least one metric, wherein the key influencers of a metric are component attributes of the associated one or more component objects that have the greatest influence on the uncertainty of the metric; and storing the at least one metric to an electronically readable medium.

\* \* \* \* \*